J. A. NEWSOM.
INSECT CATCHER.
APPLICATION FILED OCT. 30, 1913.
1,106,673.
Patented Aug. 11, 1914.
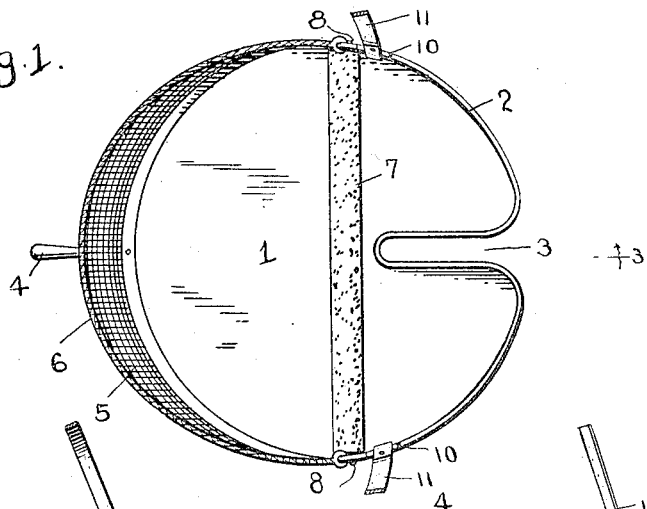
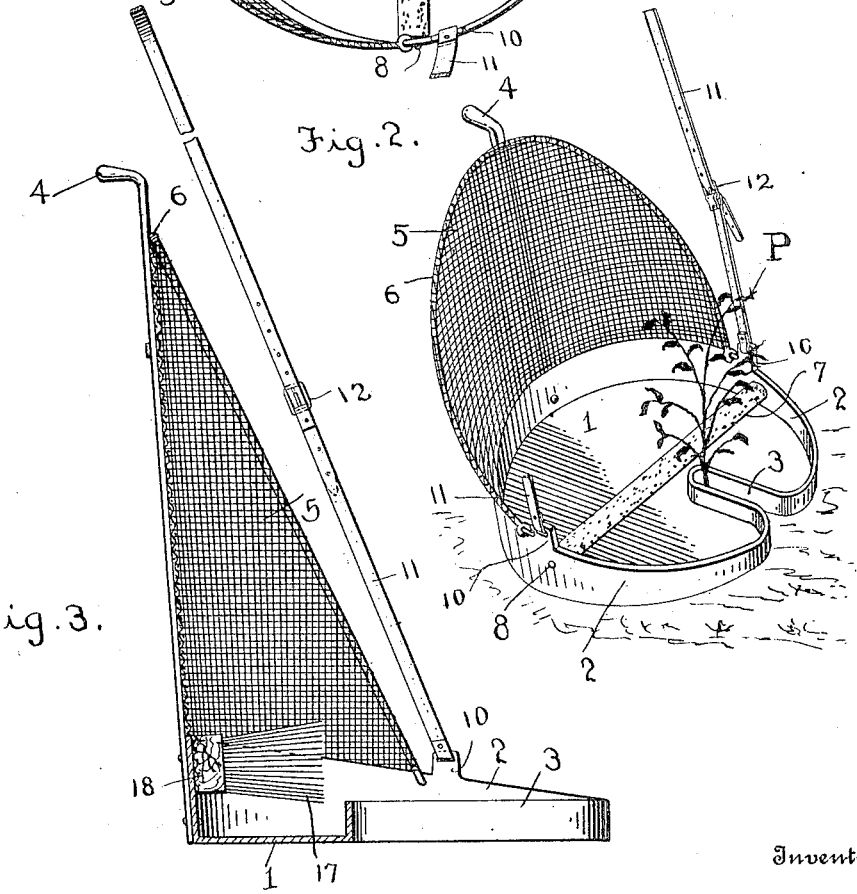
Inventor
J. A. Newsom

UNITED STATES PATENT OFFICE.

JAMES A. NEWSOM, OF YAZOO CITY, MISSISSIPPI.

INSECT-CATCHER.

1,106,673.   Specification of Letters Patent.   Patented Aug. 11, 1914.

Application filed October 30, 1913. Serial No. 788,274.

*To all whom it may concern:*

Be it known that I, JAMES ALBERT NEWSOM, a citizen of the United States, residing at Yazoo City, in the county of Yazoo and State of Mississippi, have invented certain new and useful Improvements in Insect-Catchers; and I do declare the following to be a full, clear, and exact description of the invention, such as will enable others skilled in the art to which it appertains to make and use the same.

This invention relates to insect destroyers, and more especially to those which are intended to catch the boll-weevil which infests cotton plants; and the object of the same is to produce an insect catcher of this kind by means of which both the weevil and the egg can be taken from the plant very quickly. This object is carried out by constructing the catcher in the manner hereinafter more fully described and claimed, and as shown in the drawings wherein—

Figure 1 is a plan view of this device; Fig. 2 is a perspective view thereof showing it in use; Fig. 3 is a cross section on the line 3—3 of Fig. 1, showing a slight modification in the brush.

In the drawings the numeral 1 designates the flat bottom of the body of this device which is a pan-shaped structure having surrounding sides 2 which are rather low at what will be the front of the device and rather high at the back. In contour the pan is substantially or nearly round, but it is provided in its front edge with a deep slot 3 extending rearwardly toward the center of the body and giving the entire device a heart shape when seen from above. The flange or side 2 follows the periphery and is carried around the edges of the slot 3 as shown. This much of my invention may be made of tin or light galvanized iron.

The numeral 4 designates a handle which rises from the rear of the body and may be a stiff wire rod.

The numeral 5 designates a wire screen whose lower edge is secured to the upper edge of the rear side 2 and whose upper edge is by preference mounted on a wire-bail 6 connected at its ends to the sides of the body and at its center to the handle 4.

The numeral 7 designates a brush preferably composed of stiff bristles projecting from all sides of a roller-shaped body whose extremities are journaled in the sides of the flange at the points 8 in any suitable way, and in such position that the brush extends across the interior of the body 1 slightly in rear of the inner end of the slot 3.

The use of this device is as follows: The operator grasps the handle 4 in one hand, while he carries a stick or light brush broom (not shown) in the other hand, and, bringing the mouth of the slot 3 astride the cotton plant as seen at P in Fig. 2, he presses the body 1 forward until the stalk of the plant is at the rear end of the slot 3, and then taps the bush or upper portion of the plant slightly with the stick or broom. This dislodges the insects which fall into the pan, and the latter may be partly filled with coal oil or other insecticide. The brush 7 is provided so that in removing the catcher from the plant the operator may simply lift it, with the result that the bushy part of the plant P is drawn downward through the slot 3 and the limbs and leaves thereof are wiped across and through the bristles of the brush 7 so that any other insects which have not been dislodged by the tapping action of the stick or broom will be wiped off the bush by the rotating brush. In fact the brush might have its bristles 17 fixed in and projecting from one face of a block 18 so that the latter forms the back of the brush and the same could be secured to the rear of the flange as seen in Fig. 3 if the pan were made of the right proportions. In that case the brush would not have to rotate on its bearings but its bristles would doubtless be made longer. I find that by a little practice the operator is able to shake from the bushy part of the plant the eggs or larvæ, as well as the mutilated portion of the plant in which said eggs have been placed for hatching. The result is that after a plant has been treated by a careful operator and with the use of this implement or instrument, it is thoroughly stripped of the insects and future growth will be rapid.

The proportions and materials of parts are of course not essential to the successful action of the instrument, but I would make it rather light and of such size and depth as will not tire the operator. In order to more effectively carry out this last idea, especially if the device be large, I may provide its sides 2 with ears 10 at proper points, and connect these ears by means of a strap 11 which is of sufficient length to reach over the operator's shoulder, especially if the strap be adjustable by means of a buckle as indicated at 12 so that it will fit the operator whatever his height and will permit the device to be carried at a proper height from the ground. It will be found that the shoulder strap will relieve the operator of much of the burden which would otherwise fall upon his left hand where he supports the device by means of the handle 4, although the latter in this case would be used to hold the device in proper position and to guide its slot 3 astride the plant P.

What is claimed as new is:

1. The herein described insect catcher comprising a pan of heart-shaped configuration with its slot at the front, the pan having an upstanding flange around its edge and following the sides of the slot, said flange being widest at the rear, a handle rising from the rear portion of said pan, a wire bail connected at its extremities with the flange and at its center with the handle, a wire screen whose upper edge is attached to said bail and whose lower edge is attached to the flange, and a brush carried by said flange and extending across the pan at the rear of the slot therein, the whole for use substantially as described.

2. The herein described insect catcher comprising a pan of heart-shaped configuration with its slot at the front, the pan having an upstanding flange around its edge and following the sides of the slot, a handle rising from the rear portion of the pan, and a rotary brush extending across the pan at the rear of the slot therein and having its ends journaled in said flange at the sides of the pan.

In testimony whereof I have hereunto set my hand in presence of two subscribing witnesses.

JAMES A. NEWSOM.

Witnesses:
Y. BURKE,
H. S. STRICKLAND.

Copies of this patent may be obtained for five cents each, by addressing the "Commissioner of Patents, Washington, D. C."